United States Patent
Galindo et al.

(10) Patent No.: US 10,428,258 B2
(45) Date of Patent: Oct. 1, 2019

(54) BARRIER PILLS

(71) Applicant: Halliburton Energy Services, Inc., Houston, TX (US)

(72) Inventors: Kay Ann Galindo, Montgomery, TX (US); Sandeep Kulkarni, Kingwood, TX (US); Matthew Lynn Miller, Spring, TX (US); Dale E. Jamison, Humble, TX (US); Jessica Paola Ramirez Angulo, Kingwood, TX (US); William Walter Shumway, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/538,086

(22) PCT Filed: Feb. 10, 2015

(86) PCT No.: PCT/US2015/015189
§ 371 (c)(1),
(2) Date: Jun. 20, 2017

(87) PCT Pub. No.: WO2016/130110
PCT Pub. Date: Aug. 18, 2016

(65) Prior Publication Data
US 2018/0016485 A1    Jan. 18, 2018

(51) Int. Cl.
*C09K 8/14*    (2006.01)
*E21B 33/134*    (2006.01)
(Continued)

(52) U.S. Cl.
CPC ............... *C09K 8/145* (2013.01); *C09K 8/14* (2013.01); *C09K 8/16* (2013.01); *C09K 8/24* (2013.01);
(Continued)

(58) Field of Classification Search
None
See application file for complete search history.

(56) References Cited

U.S. PATENT DOCUMENTS 2,283,510 A    5/1942   Potter
4,888,120 A *  12/1989  Mueller ................ C09K 8/145
                                               507/227
(Continued)

FOREIGN PATENT DOCUMENTS

WO    2008/130107 A1    10/2008

OTHER PUBLICATIONS

International Preliminary Report on Patentability issued in related Application No. PCT/US2015/015189, dated Aug. 24, 2017 (8 pages).
(Continued)

*Primary Examiner* — Andrew Sue-Ako
(74) *Attorney, Agent, or Firm* — Tenley Krueger; Baker Botts L.L.P.

(57) ABSTRACT

The present disclosure relates to systems and methods for wellbore pressure control with separated fluid columns. One embodiment is a composition comprising: a base fluid, a hectorite clay, a secondary clay comprising at least one clay selected from the group consisting of an attapulgite clay, a sepiolite clay, a palygorskite clay, and any combination thereof, and a plurality of fibers. Another embodiment is a method comprising: introducing a first fluid into a wellbore; introducing a barrier pill into the wellbore, wherein the barrier pill comprises: a base fluid, a hectorite clay, and a plurality of fibers; and introducing a second fluid into the wellbore. Another embodiment is a method comprising: introducing a first fluid into a wellbore; introducing a barrier pill into the wellbore, wherein the barrier pill comprises: a base fluid, a hectorite clay, and a secondary clay comprising at least one clay selected from the group consisting of an
(Continued)

attapulgite clay, a sepiolite clay, a palygorskite clay, and any combination thereof; and introducing a second fluid into the wellbore.

7 Claims, 7 Drawing Sheets

(51) Int. Cl.
*C09K 8/16* (2006.01)
*C09K 8/24* (2006.01)

(52) U.S. Cl.
CPC ........ *E21B 33/134* (2013.01); *C09K 2208/08* (2013.01)

(56) References Cited

U.S. PATENT DOCUMENTS

| | | | |
|---|---|---|---|
| 6,732,804 B2 | 5/2004 | Hosie et al. | |
| 8,201,628 B2 | 6/2012 | Lovorn et al. | |
| 8,261,826 B2 | 9/2012 | Lovorn et al. | |
| 8,418,762 B2 | 4/2013 | Casey et al. | |
| 8,657,034 B2 | 2/2014 | Leuchtenberg | |
| 2005/0150425 A1 | 7/2005 | Gallagher et al. | |
| 2008/0060811 A1* | 3/2008 | Bour | C04B 26/04 166/291 |
| 2011/0172130 A1* | 7/2011 | Sarap | C09K 8/40 507/269 |
| 2011/0180259 A1 | 7/2011 | Willberg et al. | |
| 2014/0262268 A1 | 9/2014 | Kageler | |
| 2015/0008044 A1 | 1/2015 | Fontenot | |

OTHER PUBLICATIONS

International Search Report and Written Opinion issued in related PCT Application No. PCT/US2015/015189 dated Oct. 22, 2015, 11 pages.

\* cited by examiner

BARRIER PILLS

CROSS-REFERENCE TO RELATED APPLICATION

The present application is a U.S. National Stage Application of International Application No. PCT/US2015/015189 filed Feb. 10, 2015, which is incorporated herein by reference in its entirety for all purposes.

BACKGROUND

The present disclosure relates to systems and methods for treating subterranean formations. More particularly, the present disclosure relates to systems and methods for wellbore pressure control with separated fluid columns.

In underbalanced and managed pressure drilling and completion operations, it is often beneficial to be able to maintain precise control over pressures and fluids exposed to drilled-through formations and zones. In the past, specialized equipment (such as downhole deployment valves, snubbing units, etc.) have been utilized to provide for pressure control in certain situations (such as, when tripping pipe, running casing or liner, wireline logging, installing completions, etc.) However, this specialized equipment (like most forms of equipment) is subject to failure, can be time-consuming and expensive to install and operate, and may not be effective in certain operations. For example, downhole deployment valves have been known to leak and snubbing units are ineffective to seal about slotted liners.

In addition to (or in lieu of) the specialized equipment, other approaches have involved the use of thixotropic fluids to form a barrier pill. As used herein, the term "barrier pill" refers to a batch of fluid and/or gel that is introduced into a wellbore to keep two other fluid layers substantially separate. For example, a barrier pill may be used to maintain a column of a low density fluid below a column of a high density fluid. If the barrier pill was not introduced, the higher density fluid would sink to the bottom of the wellbore. However, the materials used in barrier pills often lack sufficient strength or are prone to degradation in wellbore conditions.

BRIEF DESCRIPTION OF THE DRAWINGS

These drawings illustrate certain aspects of some of the embodiments of the present disclosure, and should not be used to limit or define the claims.

FIG. 5 is a pair of graphs illustrating the effect of attapulgite clay and caustic soda on a barrier pill that is exposed to salt.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for treating subterranean formations. More particularly, the present disclosure relates to systems and methods for wellbore pressure control with separated fluid columns.

The present disclosure provides methods and systems for separating different fluids in a wellbore and managing pressure, for example, while drilling. The separated fluids include, but are not limited to, drilling fluids, treatment fluids, and formation fluids. As used herein, the term "drilling fluid" refers to any fluid that is circulated in the wellbore during a drilling operations including fluids which may, for example, be used to lubricate the drill or remove cuttings from the wellbore. As used herein, the term "treatment fluid" refers to any fluid used in a subterranean operation in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like. As used herein, the term "formation fluid" refers to any fluid that is naturally present in a subterranean formation. In certain embodiments, the separated fluids may have different densities, and the fluid having the greater density may be in the upper or lower half of the fluid column.

In particular, the present disclosure provides a barrier pill that may be used, among other purposes, to separate the different fluids present in a wellbore and to manage pressure while drilling. In certain embodiments, the barrier pill may comprise a thixotropic fluid. In certain embodiments, the barrier pill may be placed on top of a fluid or between the different fluid layers and forms a physical barrier between them. The barrier pill has sufficient mechanical properties to prevent the two fluids from mixing (or reduce the degree to which they mix) and, in some embodiments, to prevent a heavier fluid that is placed at a relatively upper portion of the wellbore from settling to the lower portion of the wellbore.

Among the many potential advantages to the methods and compositions of the present disclosure, only some of which are alluded to herein, the methods, compositions, and systems of the present disclosure may improve the gel strength of the barrier pill. Additionally, the methods and compositions of the present disclosure may make the barrier pill less degradable in wellbore conditions, including wellbore conditions that have a high degree of salinity. It is also believed that certain embodiments of the present disclosure may result in an increase in tolerance to contamination and an increase in tolerance to temperature variation. These improvements could be used in conjunction with conventional equipment (such as downhole deployment valves, snubbing units, etc.), or they could be substituted for such conventional equipment. The improvements could be used in underbalanced and managed pressure drilling and completion operations, and/or in other types of well operations.

In general, the barrier pills of the present disclosure comprise a base fluid and a hectorite clay. In certain embodiments, the barrier pill further comprises a plurality of fibers. In certain embodiments, the barrier pill further comprises a secondary clay. In certain embodiments, the barrier pill further comprises a strong base. In certain embodiments, the barrier pill further comprises a weighting agent. In various embodiments, the barrier pill may comprise one or more of the plurality of fibers, the secondary clay, the strong base, and the weighting agent.

The barrier pills used in the methods and systems of the present disclosure may comprise any aqueous base fluid known in the art. The term "base fluid" refers to the major component of a fluid (as opposed to components dissolved and/or suspended therein), and does not indicate any particular condition or property of that fluids such as its mass, amount, pH, etc. Aqueous fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein.

The hectorite clay used in the methods, compositions, and systems of the present disclosure may comprise any hectorite clay known in the art. In certain embodiments, the hectorite clay may be naturally occurring. In other embodiments, the hectorite clay may be synthetic. In some embodiments, the hectorite clay is present in the barrier pill in a concentration of about 4 to about 10 pounds per barrel. In other embodiments, the hectorite clay is present in the barrier pill in a concentration of about 5 to about 10 pounds per barrel. A person of skill in the art, with the benefit of this disclosure, would be able to choose the appropriate concentration of hectorite clay to achieve a barrier pill with a desired gel strength.

In certain embodiments, the barrier pill may further comprise a plurality of fibers. Any suitable fiber may be used according to the teachings of the present disclosure, including natural, biopolymers, synthetic, biodegradable, and/or biocompatible fibers. Examples of synthetic fibers include, but are not limited to, fibers composed of polymers such as polypropylene, polyaramide, polyester, polyacrylonitrile, and polyvinyl alcohol. Examples of biodegradable fibers include, but are not limited to, fibers composed of modified cellulose, chitosan, soya, modified chitosan, polycaprolactone, poly(3-hydroxybutyrate), polyhydroxy-alkanoates, polyglycolic acid ("PGA"), polylactic acid ("PLA"), polyorthoesters, polycarbonates, polyaspartic acid, polyphosphoesters, soya, or copolymers thereof. Examples of other suitable fibers include, but are not limited to, fibers of cellulose including viscose cellulosic fibers, oil coated cellulosic fibers, and fibers derived from a plant product like paper fibers; carbon including carbon fibers; melt-processed inorganic fibers including basalt fibers, wollastonite fibers, non-amorphous metallic fibers, ceramic fibers, and glass fibers. In some embodiments, a surfactant may be added to the barrier pill to facilitate the dispersion of the fibers.

The individual fibers generally have a length that is greater than the diameter. The fibers may have a variety of lengths. In certain embodiments, the fibers may have a distribution such that at least 90% of the fibers have a length in the range of about 0.5 millimeters (mm) to about 25 mm. The fibers may also have a variety of diameters. In certain embodiments, the fibers may have a length to diameter aspect ratio in the range of about 2:1 to about 5,000:1.

Any suitable amount of fibers may be included in the barrier pill to achieve the desired mechanical properties. In certain embodiments, the fibers are present in the barrier pill in a concentration of about 0.1 pounds per barrel to about 50 pounds per barrel. In certain embodiments, a lower concentration of fibers (by weight) having a longer length will provide the barrier pill with the same increase of strength as a higher concentration of fibers having a shorter length.

In certain embodiments, the barrier pill may further comprise a secondary clay. Examples of the secondary clay that may be suitable for the methods and compositions of the present disclosure include, but are not limited to, an attapulgite clay, a sepiolite clay, and a palygorskite clay. In certain embodiments, the secondary clay may be naturally occurring. In other embodiments, the secondary clay may be synthetic. In certain embodiments, the secondary clay is present in the barrier pill in a concentration of about 0.5 pounds per barrel to about 30 pounds per barrel. In other embodiments, the secondary clay is present in the barrier pill in a concentration of about 4 pounds per barrel to about 8 pounds per barrel.

Without limiting the disclosure to any particular theory or mechanism, the hectorite clay and the secondary clay provide complementary qualities to the barrier pill. For example, hectorite clay provides good viscosity but is susceptible to degradation when exposed to salt. The secondary clay, such as attapulgite clay, provides some viscosity but is less affected by salt and less susceptible to degradation. It has been found that the combination of hectorite clay and secondary clay provides a barrier pill with an optimal balance of viscosity and resistance to salt.

In certain embodiments where the barrier pill comprises both hectorite clay and secondary clay, the total amount of clay (i.e., the amount of both hectorite clay and secondary clay) present in the barrier pill may have a concentration of about 8 to about 20 pounds per barrel. In some embodiments, the total amount of clay present in the barrier pill may have a concentration of about 10 to about 17 pounds per barrel. The ratio of hectorite clay relative to the secondary clay may be adjusted depending on the desired properties of the barrier pill. In some embodiments, the barrier pill should contain more hectorite clay than secondary clay. In certain embodiments, the ratio of hectorite clay to secondary clay may vary from about 1:1 to about 2:1. In other embodiments, the ratio of hectorite clay to secondary clay may be about 6:5.

In certain embodiments, the barrier pill may further comprise a strong base. Suitable strong bases include, but are not limited to, hydroxide bases and quick lime (CaO). In one embodiment, the strong base is caustic soda, an inorganic compound with a formula of NaOH. In certain embodiments, the strong base is present in the barrier pill in a concentration up to about 1 pound per barrel. In certain embodiments, the strong base is present in the barrier pill in a concentration of about 0.25 to about 0.5 pounds per barrel. In some embodiments, enough strong base is added to the barrier pill to achieve a pH of about 11. A person of skill in the art, with the benefit of this disclosure, would be able to choose the appropriate concentration of strong base to achieve, for example, the desired pH value. In some embodiments, the strong base may help activate the hectorite clay by increasing the viscosity, the gel strength, and the salt tolerance of the hectorite clay.

In certain embodiments, the barrier pill may further comprise a weighting agent. Examples of weighting agents that may be suitable for the methods and compositions of the present disclosure include, but are not limited to, barite, calcium carbonate, iron oxide, illmenite, manganese tetroxide, magnesium carbonate, and iron carbonate. The weighting agent may be added to the barrier pill to adjust the density of the barrier pill. For example, a greater density (and a higher concentration of weighting agent) may be used when the barrier pill will be introduced into a wellbore where there is a higher formation fluid pressure. In certain embodiments, the density of the barrier pill may range from about 8 pounds per gallon to about 22 pounds per gallon. A person of skill in the art, with the benefit of this disclosure, will know how much weighting agent to add to the barrier pill to achieve a desired density.

In certain embodiments, the barrier pills used in the methods and systems of the present disclosure optionally may comprise any number of additional additives. Examples of such additional additives include, but are not limited to, corrosion inhibitors, pH buffers, oxygen scavengers, $H_2S$ scavengers, polymeric viscosifiers, fluid loss control agents, surfactants, and hydrate suppressants. A person skilled in the art, with the benefit of this disclosure, will recognize the types of additives that may be included in the fluids of the present disclosure for a particular application.

The barrier pills of the present disclosure may be prepared by any suitable method. In some embodiments, the barrier pills may be prepared on the job site. As an example of such an on-site method, the optional additional components may be added to the barrier pill during pumping. In other embodiments, the barrier pills of the present disclosure may be prepared remotely and transported to the job site.

The present disclosure in some embodiments provides methods for using the barrier pills to use in connection with carrying out a variety of subterranean treatments, including but not limited to, hydraulic fracturing treatments, acidizing treatments, and drilling operations. In some embodiments, the barrier pills of the present disclosure may be used in connection with treating a portion of a subterranean formation, for example, in acidizing treatments such as matrix acidizing or fracture acidizing. In certain embodiments, a barrier pill may be introduced into a subterranean formation. In some embodiments, the barrier pill may be introduced into a wellbore that penetrates a subterranean formation.

The present disclosure in some embodiments provides methods for using the barrier pill. In one embodiment, a barrier pill according to the present disclosure may be used in connection with managed pressure drilling. During managed pressure drilling, the hydrostatic pressure of the drilling fluid can be regulated with the use of back-pressure pumps in combination with the drilling fluid density to balance the high pressure of formation fluids in the subterranean formation. The back pressure is supplied by a surface pump and is held in place by specialized rotating head assembly that provides a seal around the drill-pipe allowing the system to be pressurized. However, when the operator needs to remove the drill string (for example, to change the drill-bit or conduct other maintenance), the operator will no longer have the seal of the rotating head to control back pressure and so the operator may often place a high weight mud-cap on top of the drilling fluid to maintain the pressure of the column. A barrier pill may be used to keep the two layers separate. If the barrier pill was not used, the heavier mud may displace the drilling fluid and sink to the bottom of the wellbore or the heavier mud would commingle with the active drilling fluid resulting in the need to dilute and recondition fluid after tripping.

In one embodiment, the following steps may be used to place the barrier pill in the wellbore. First, a section of the wellbore is drilled or stripped out while using a managed pressure drilling control system (where the drilling fluid is maintained at a high pressure to balance the pressure of formation fluids). Second, approximately 250 feet of the barrier pill is placed in the wellbore using a pump. Third, the bottom of the drill string is pulled up about 20 feet above top of the barrier pill and the gel is allowed to form for about 30 minutes. Fourth, a high density mud cap is placed above the barrier pill by displacing the drilling fluid. Finally, the operator may trip out of wellbore without using the managed pressure drilling control system.

According to this embodiment, when the operator is ready to resume drilling operation, the following steps may be used to remove the barrier pill from the wellbore: First, the operator trips back to top of barrier pill and activates the managed pressure drilling control system. Second, the mud cap is displaced with drilling fluid. Third, the wellbore pressure is controlled with the managed pressure drilling system while rotating and/or washing through the barrier pill to destroy the gel plug and incorporate the pill into the active system. Once the barrier pill has been removed, the operator may continue drilling forward or perform casing operations.

The exemplary barrier pills disclosed herein may directly or indirectly affect one or more components or pieces of equipment associated with the preparation, delivery, recapture, recycling, reuse, and/or disposal of the disclosed barrier pills. For example, and with reference to FIG. 1, the disclosed barrier pills may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

Figure 1:
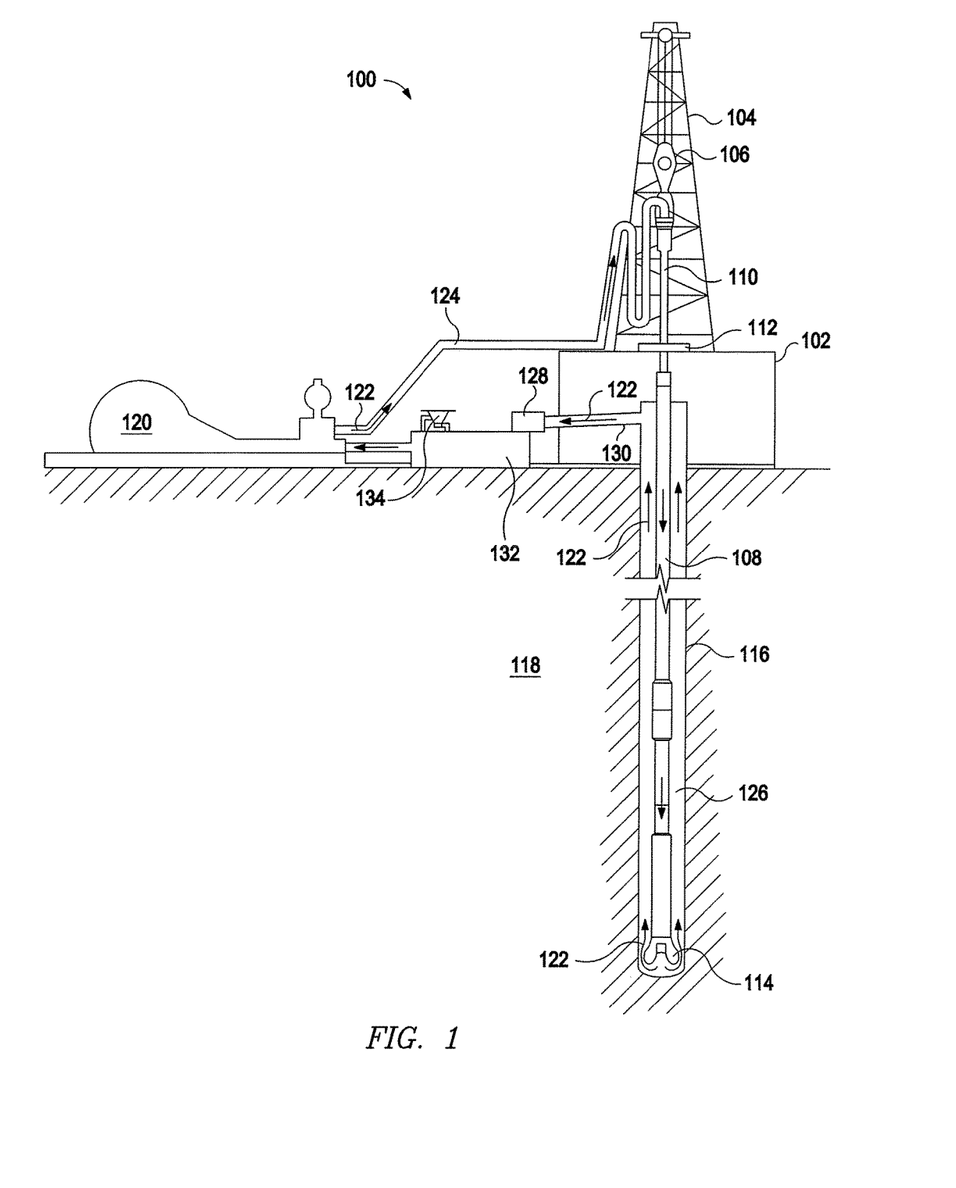
FIG. 1 is a diagram illustrating an exemplary system where embodiments according to the present disclosure may be used.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

Other additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the additives may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the additives may be stored, reconditioned, and/or regulated until added to the drilling fluid 122.

The disclosed barrier pills may directly or indirectly affect the drilling system 100. For example, as described above, the barrier pills may be introduced into the borehole 116 in connection with removing the drill string 108 from the borehole. This facilitates the introduction of a heavy mud cap (not shown) to help maintain the hydrostatic pressure of drilling fluid 122 at the bottom of the borehole 116.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Example 1

Several tests were run to evaluate the effect of adding fibers to a barrier pill. The barrier pills tested each comprised hectorite clay, caustic soda, and barite. Several "control" pills (i.e., pills without fiber) were tested first. A 10 lb/gal pill containing 8 lb/bbl hectorite clay supported up to an 8 lb/gal fluid density differential. In contrast, a 10 lb/gal pill containing 6 lb/bbl hectorite clay was less viscous although it remained effective in supporting a 5 lb/gal mud weight differential.

Figure 2:
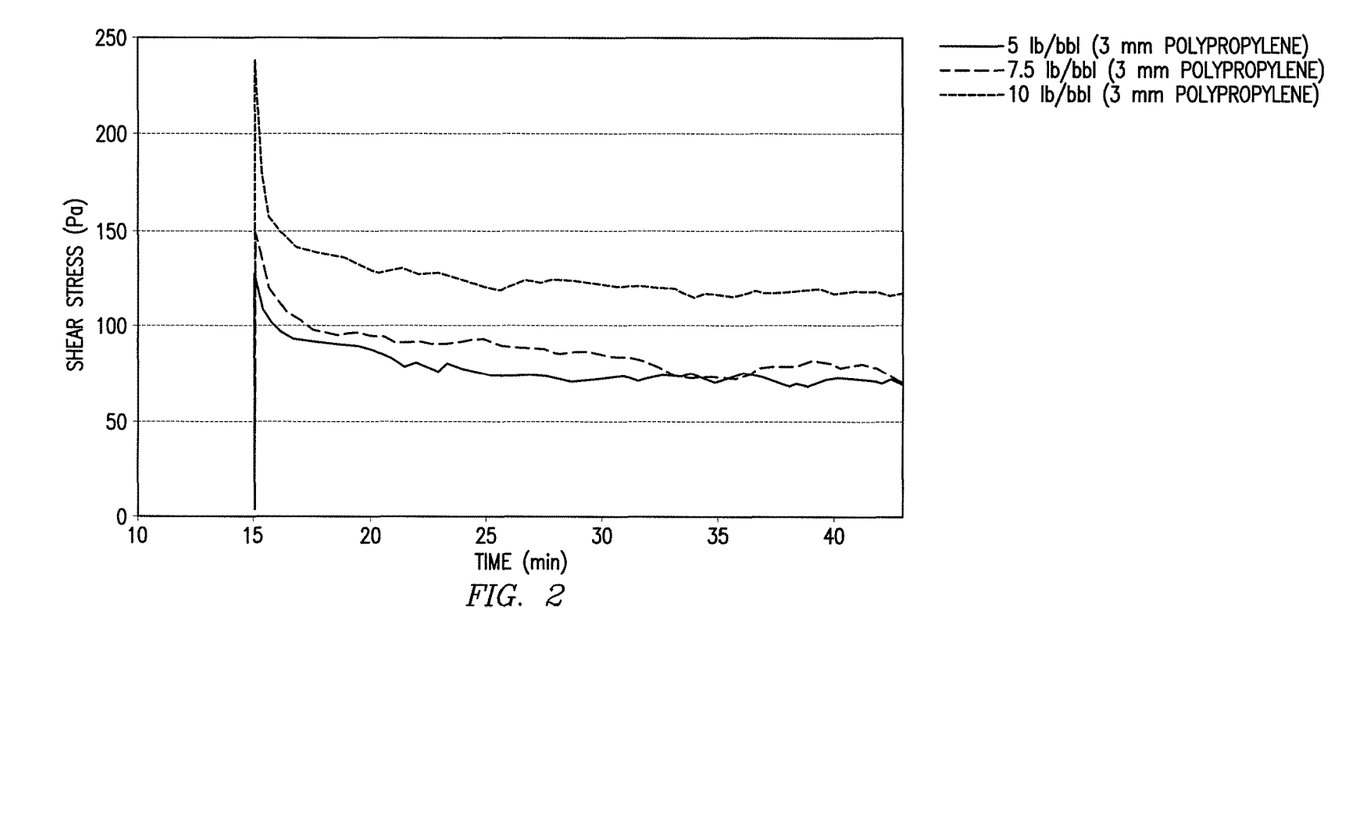
FIG. 2 is a graph illustrating the effect of 3 mm polypropylene fibers on the strength of a barrier pill comprising hectorite clay, caustic soda, and barite.

The fibers were tested using a 10 lb/gal pill containing 6 lb/bbl hectorite clay. As shown in FIG. 2, the addition of 3 mm polypropylene fibers increased the gel strength of the barrier pill. The sample containing 10 lb/bbl of the fibers increased the strength of the barrier pill the most. However, the samples containing 7.5 lb/bbl and 5 lb/bbl of the fibers also increased the strength of the barrier pills.

Figure 3:
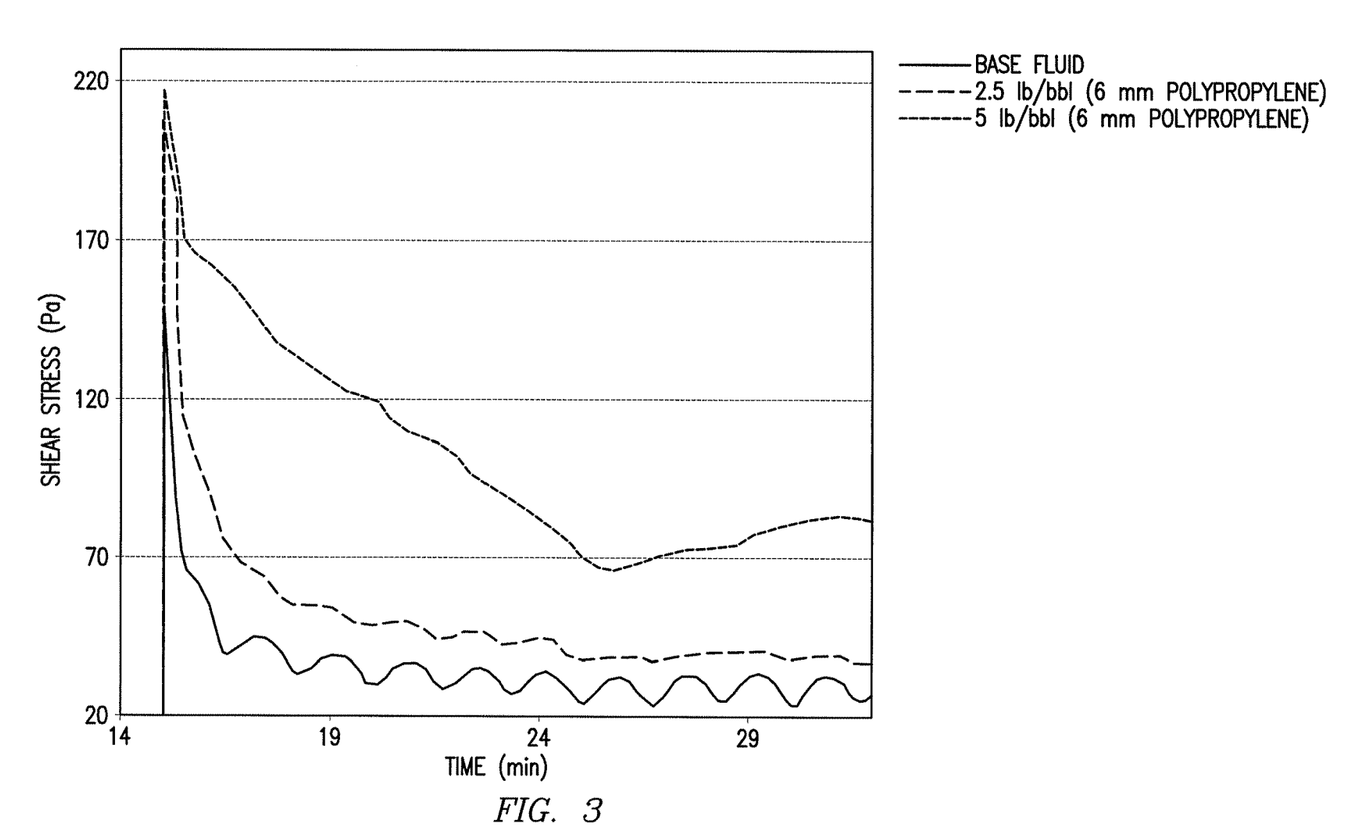
FIG. 3 is a graph illustrating the effect of 6 mm polypropylene fibers on the strength of a barrier pill comprising hectorite clay, caustic soda, and barite.
Figure 4:
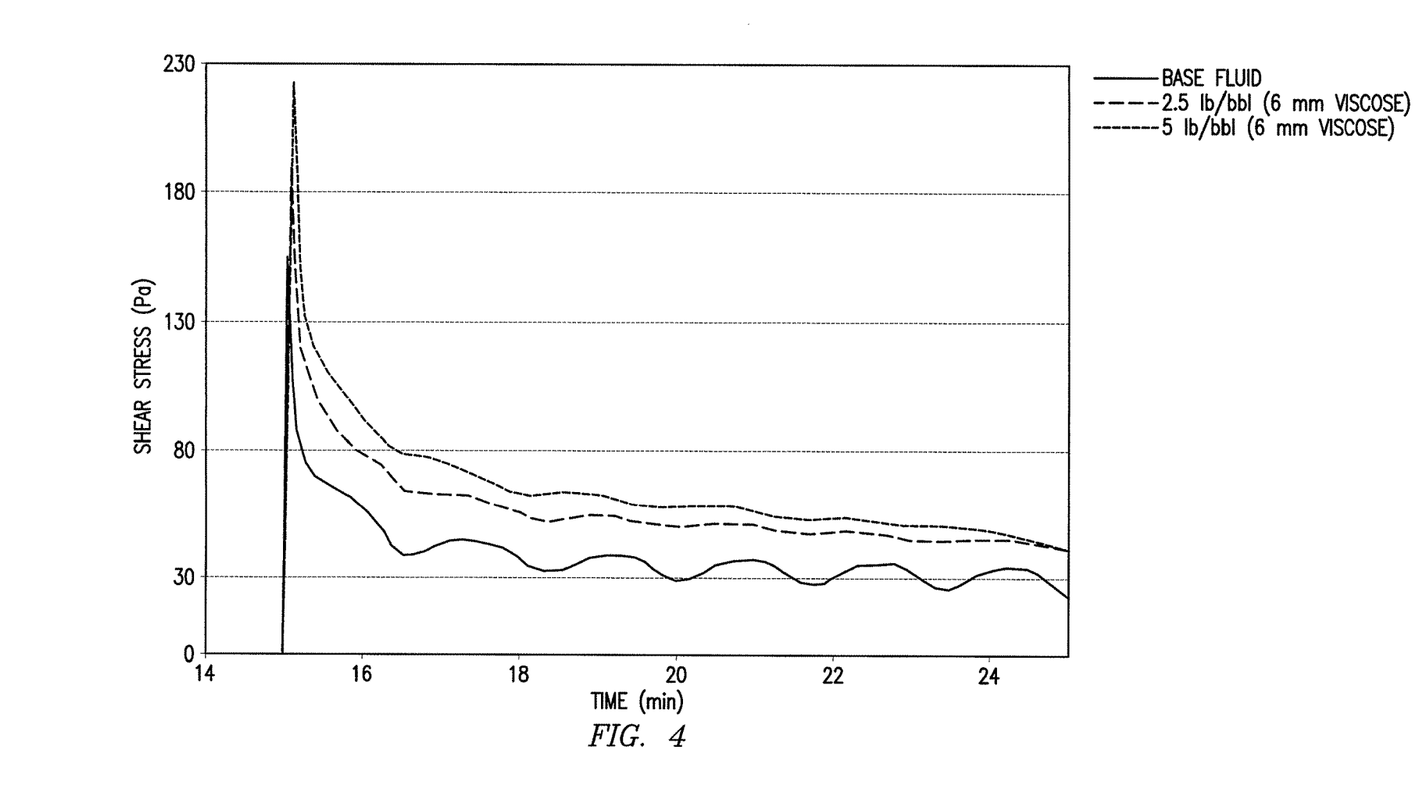
FIG. 4 is a graph illustrating the effect of 6 mm viscose fibers on the strength of a barrier pill comprising hectorite clay, caustic soda, and barite.

It was also found that the addition of 6 mm polypropylene fibers increased the strength of the barrier pills at lower concentrations relative to the 3 mm polypropylene fibers. See FIG. 3. Similar gel strengths were also observed with 6 mm viscose fibers. See FIG. 4. Therefore, increased fiber length decreased the concentration of fibers needed.

Example 2

Several tests were run to evaluate the effect of adding attapulgite clay and caustic soda to a barrier pill. A set of barrier pills was prepared as a control group containing 11 lb/bbl hectorite clay. A set of barrier pills was prepared as an experimental group containing the formula in Table 1:

TABLE 1

| Barrier Pill Composition | |
|---|---|
| Compound | Amount |
| Hectorite Clay | 6 lb/bbl |
| Attapulgite Clay | 5 lb/bbl |
| Caustic Soda | 0.25 lb/bbl |
| Barite/BARACARB ® | As needed |

The original formulation containing only hectorite clay was susceptible to viscosity degradation by salt contamination. The new formulation addresses shortcomings of the previous pill: The inclusion of attapulgite clay and caustic soda increased the salt resistance of the pill relative to only having hectorite clay in the formulation without loss of thixotropic properties.

Figure 5A:
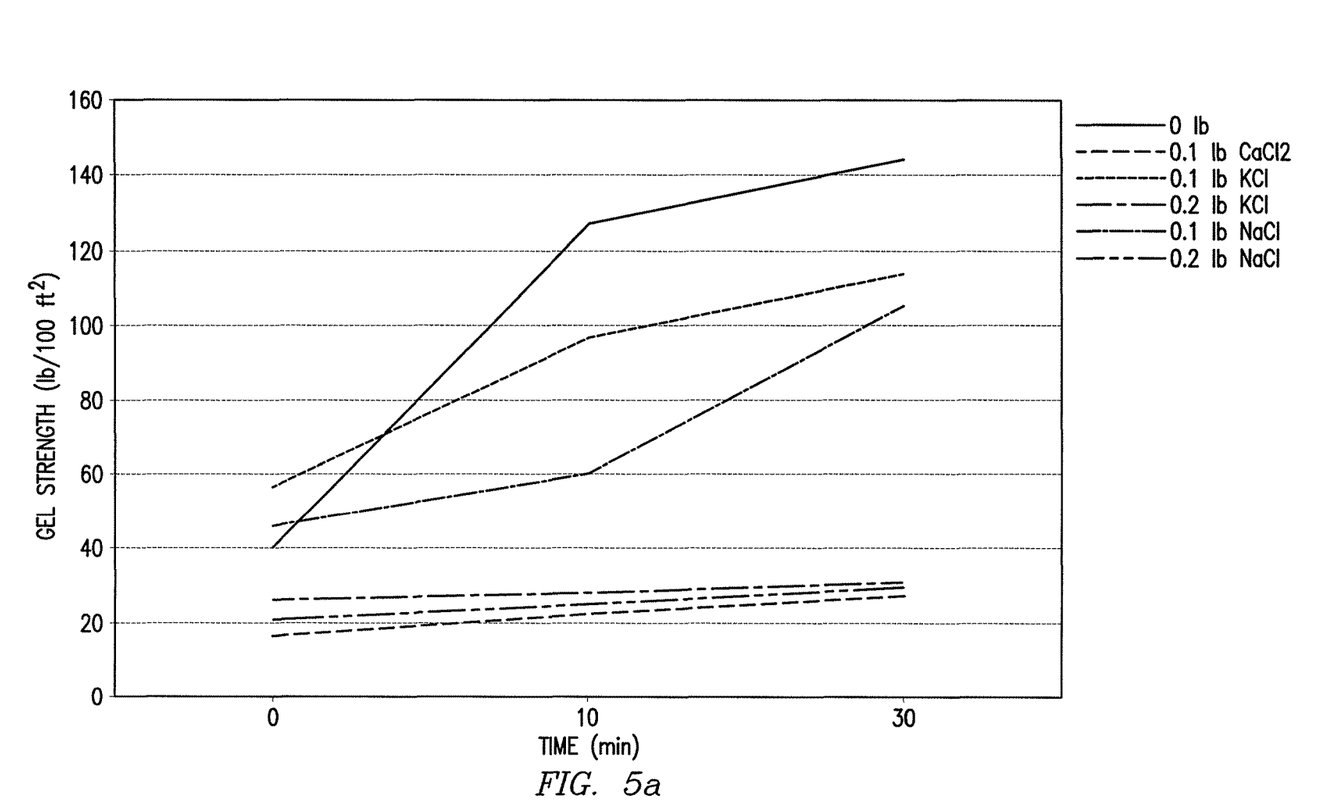
FIG. 5a illustrates the results for a barrier pill that contains only hectorite clay.
Figure 5B:
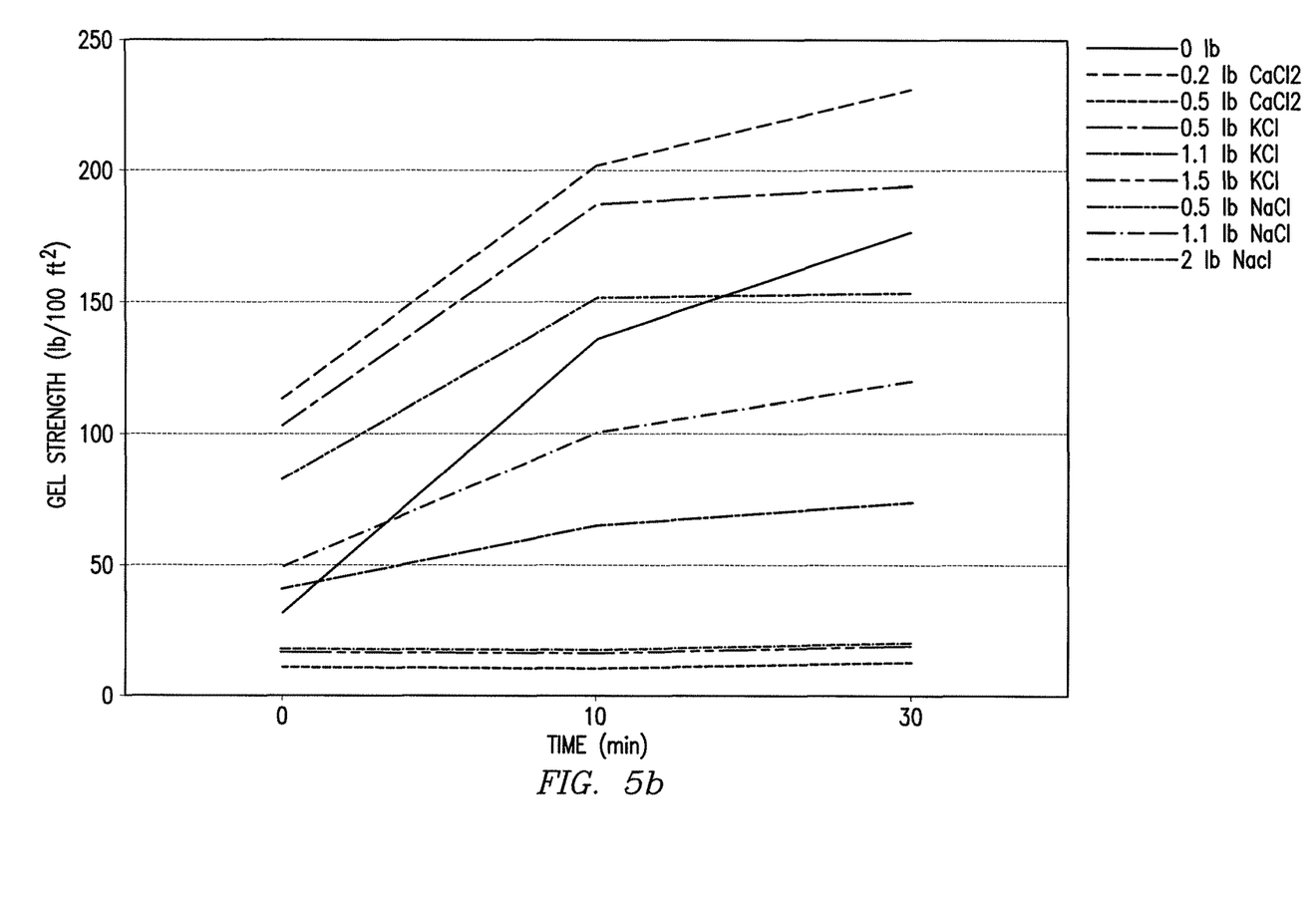
FIG. 5b illustrates the results for a barrier pill that contains hectorite clay, attapulgite clay, and caustic soda.

As shown in FIG. 5, the barrier pills containing attapulgite clay and caustic soda experienced less degradation when exposed to salt. FIG. 5*a* illustrates the results for a barrier pill that contains only hectorite clay. FIG. 5*b* illustrates the results for a barrier pill that contains hectorite clay, attapulgite clay, and caustic soda Also, three sample columns were prepared (shown in FIG. 6) where a 10.2 lb/gal barrier pill was used to separate a heavy mud from a light mud. In the left column, an 18 lb/gal water-based mud was placed at the top of the column while a 10.2 lb/gal water-based mud was placed at the bottom of the column. In the center column, an 18 lb/gal oil-based mud was placed at the top of the column while a 10.2 lb/gal oil-based mud was placed at the bottom of the column. In the right column, an 18 lb/gal water-based mud (with potassium chloride) was placed at the top of the column while a 10.2 lb/gal water-based mud (with potassium chloride) was placed at the bottom of the column.

Figure 6:
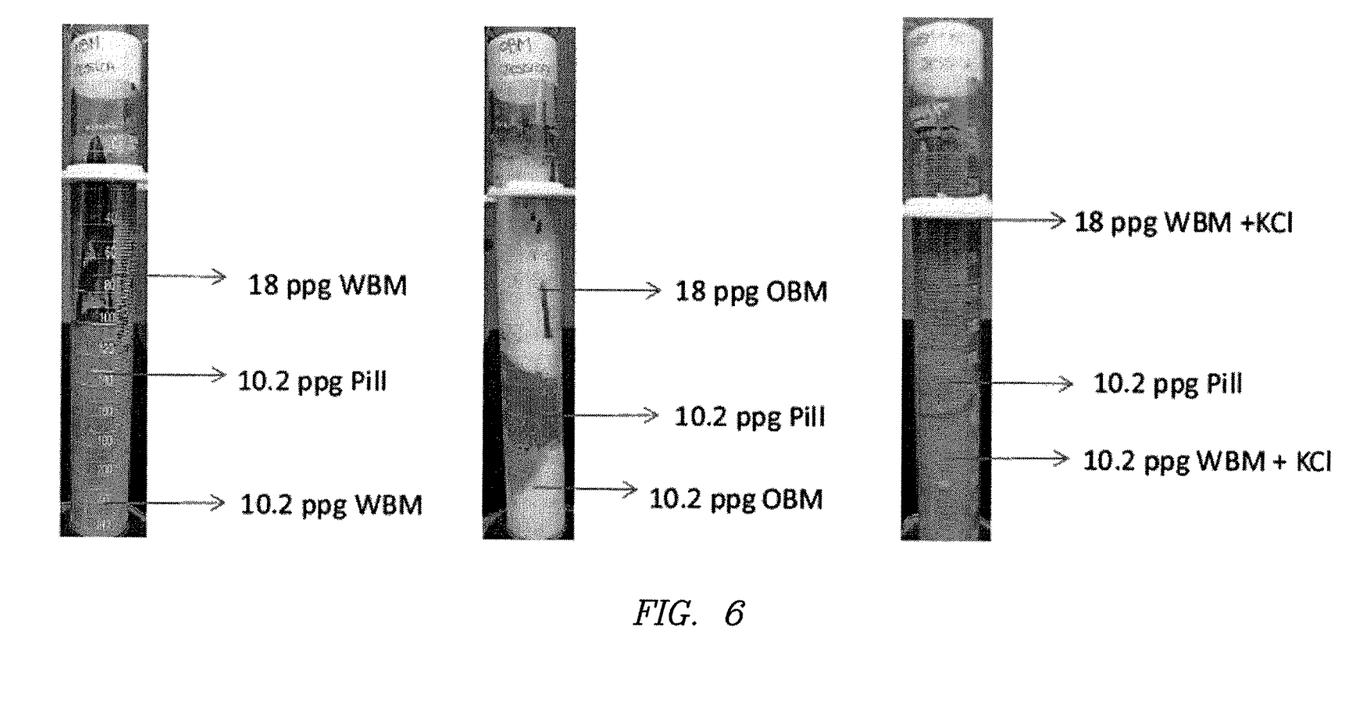
FIG. 6 illustrates three sample columns in which barrier pills prepared according to an embodiment of the present disclosure have been tested.

All three columns were allowed to rest for a period of one week at a temperature of 150° F. As can be seen in FIG. 6, there was essentially no mixing at the end of the week, demonstrating the ability of the barrier pill to support the heavier mud at the top of the column. This was equally true for water-based mud, oil-based mud, and water-based mud with a high salinity content.

An embodiment of the present disclosure is a composition comprising: a base fluid, a hectorite clay, a secondary clay comprising at least one clay selected from the group consisting of an attapulgite clay, a sepiolite clay, a polygorskite palygorskite clay, and any combination thereof, and a plurality of fibers. Optionally, the composition further comprises a strong base selected from the group consisting of a hydroxide base, quick lime, and any combination thereof. Optionally, the composition further comprises a weighting agent. Optionally, the fibers comprise at least one material selected from the group consisting of: polypropylene, polyaramide, polyester, polyacrylonitrile, polyvinyl alcohol, chitosan, soya, modified chitosan, polycaprolactone, poly(3-hydroxybutyrate), polyhydroxy-alkanoate, polyglycolic acid, polylactic acid, polyorthoester, polycarbonate, polyaspartic acid, polyphosphoester, cellulose, paper fiber, carbon fiber, basalt fiber, wollastonite fiber, non-amorphous metallic fiber, ceramic fiber, glass fiber, and any combination thereof. Optionally, at least 90% of the fibers have a length in the range of about 0.5 mm to about 25 mm. Optionally, the hectorite clay and the secondary clay are present in amounts having a ratio between a 1:1 and 2:1.

Another embodiment of the present disclosure is a method comprising: introducing a first fluid into a wellbore; introducing a barrier pill into the wellbore, wherein the barrier pill comprises: a base fluid, a hectorite clay, and a plurality of fibers; and introducing a second fluid into the wellbore. Optionally, the barrier pill separates the first fluid and the second fluid. Optionally, the barrier pill further comprises a strong base selected from the group consisting of a hydroxide base, quick lime, and any combination thereof. Optionally, the barrier pill further comprises a weighting agent. Optionally, the fibers comprise at least one material selected from the group consisting of: polypropylene, polyaramide, polyester, polyacrylonitrile, polyvinyl alcohol, chitosan, soya, modified chitosan, polycaprolactone, poly(3-hydroxybutyrate), polyhydroxy-alkanoate, polyglycolic acid, polylactic acid, polyorthoester, polycarbonate, polyaspartic acid, polyphosphoester, cellulose, paper fiber, carbon fiber, basalt fiber, wollastonite fiber, non-amorphous metallic fiber, ceramic fiber, glass fiber, and any combination thereof. Optionally, the barrier pill further comprises a secondary clay comprising at least one clay selected from the group consisting of an attapulgite clay, a sepiolite clay, a palygorskite clay, and any combination thereof. Optionally, the barrier pill is introduced into the wellbore using at least one pump.

Another embodiment of the present disclosure is a method comprising: introducing a first fluid into a wellbore; introducing a barrier pill into the wellbore, wherein the barrier pill comprises: a base fluid, a hectorite clay, and a secondary clay comprising at least one clay selected from the group consisting of an attapulgite clay, a sepiolite clay, a palygorskite clay, and any combination thereof; and introducing a second fluid into the wellbore. Optionally, the barrier pill separates the first fluid and the second fluid. Optionally, the barrier pill further comprises a strong base selected from the group consisting of a hydroxide base, quick lime, and any combination thereof. Optionally, the barrier pill further comprises a weighting agent. Optionally, the hectorite clay and the secondary clay are present in amounts having a ratio between a 1:1 and 2:1. Optionally, the barrier pill further comprises a plurality of fibers. Optionally, the barrier pill is introduced into the wellbore using at least one pump.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   introducing a first fluid into a wellbore;
   introducing a clay-based barrier pill into the wellbore, wherein the barrier pill comprises:
   a strong base selected from the group consisting of a hydroxide base, quick lime, and any combination thereof,
   a naturally occurring hectorite clay, and
   a naturally occurring secondary clay comprising at least one clay selected from the group consisting of an attapulgite clay, a sepiolite clay, a palygorskite clay, and any combination thereof, wherein the barrier pill has a clay concentration between about 8 and about 20 pounds per barrel, and wherein a gel strength of the barrier pill is substantially maintained or increased, or decreases less than a gel strength of the barrier pill without the secondary clay, when the barrier pill is exposed to one or more salts; and
   introducing a second fluid into the wellbore.

2. The method of claim 1, wherein the barrier pill separates the first fluid and the second fluid.

3. The method of claim 1, wherein the barrier pill further comprises a weighting agent.

4. The method of claim 1, wherein the hectorite clay and the secondary clay are present in amounts having a ratio between a 1:1 and 2:1.

5. The method of claim 1, wherein the barrier pill further comprises a plurality of fibers.

6. The method of claim 1 wherein the barrier pill is introduced into the wellbore using at least one pump.

7. The method of claim 1 wherein the barrier pill has a hectorite clay concentration between about 4 and about 10 pounds per barrel and a secondary clay concentration between about 4 and about 8 pounds per barrel.

* * * * *